United States Patent [19]
Porat

[11] Patent Number: 6,071,365
[45] Date of Patent: Jun. 6, 2000

[54] APPARATUS FOR AND METHOD OF WRAPPING BOARDS

[75] Inventor: Thomas M. Porat, Concord, N.H.

[73] Assignee: Crathern Engineering Co., Inc., Contoocook, N.H.

[21] Appl. No.: 09/183,515

[22] Filed: Oct. 30, 1998

Related U.S. Application Data

[62] Division of application No. 08/910,671, Aug. 13, 1997, Pat. No. 5,885,405.

[51] Int. Cl.⁷ ....................................... B32B 3/04
[52] U.S. Cl. ..................... 156/216; 156/475; 156/477.1
[58] Field of Search .................... 156/216, 475, 156/477.1, 479, 88

[56] References Cited

U.S. PATENT DOCUMENTS

| | | | |
|---|---|---|---|
| 3,580,770 | 5/1971 | Dyal | 156/216 |
| 3,977,932 | 8/1976 | Fries et al. | 156/216 |

*Primary Examiner*—Michael W. Ball
*Attorney, Agent, or Firm*—Schiller & Associates

[57] ABSTRACT

Apparatus for and process of folding and securing edges of a relatively large wrap over corresponding edges of a smaller board positioned on and in contact with an adhesively coated surface of the wrap to form a laminated work-piece, the work-piece being moved in a first direction to a first wrapping head having a pair of movable jaws defining a slot. An edge if the sheet extending from the work-piece, is engaged and folded over a corresponding edge of the board and adhesively adheres to the opposite surface of the board. The folded-over edge is then clamped between the jaws of the first wrapping head and carried in that manner in an opposite direction in a parallel but displaced second plane to a similar slot in a second, like, wrapping head. At the latter, the opposite edge of the sheet extending from the work-piece is similarly engaged, folded over and adhered to the board. The folded over opposite edge is then clamped by the jaws of the second wrapping head which serves to transport the work-piece in that manner, back in the first direction but in a third plane displaced from the first and second planes, for side-edge wrapping.

4 Claims, 8 Drawing Sheets

APPARATUS FOR AND METHOD OF WRAPPING BOARDS

This is a division of application Ser. No. 09/910,671, Aug. 13, 1997, filed now U.S. Pat. No. 5,885,405.

This invention relates to board laminating systems, and more particularly to an improved method of and apparatus for wrapping thin sheets around the edges of stiff board materials.

A number of devices are known that sequentially wrap or turn relatively thin sheets of material, such as paper and the like, around the edges of one or more flat boards, typically chipboard and the like. For example, a cover sheet or pliant wrap is provided as a rectangle with dimensions larger than the corresponding dimensions of one or more rectangular, relatively rigid boards so that the boards can be spotted or positioned on one surface of the wrap with overlapping edges of the wrap extending beyond corresponding edges of the boards. To secure the wrap to the board or boards neatly, the wrap is usually adhesively attached to the boards, and the overlapping edges of the wrap are folded over the corresponding edges of the board or combinations of boards and adhesively secured to the opposite common surface of the boards. The wrap can be provided in the form of a continuous roll that is cut to the proper size when introduced into the wrapping process, or can be provided as a stack of precut, preformed sheets for a sheet feeder operating at the input of the wrapping system. Usually the boards are provided as one or more stacks of precut boards. Such wrapping systems find utility, for example, in manufacturing book binders formed of front, spine and back boards all connected to a single wrap, in manufacturing slip-cases made of two like-sized, congruent boards held together with a wrap to form a pocket, and other like processes.

Many of the currently available wrapping systems are designed to make long production runs of a single size of wrapped board or boards, and do not accommodate readily to relatively short production runs of various sizes of wrapped boards. Also, the folding operations are typically effected at fixed stations, the boards being transported between the several stations as by rollers and the like. Some wrap materials, such as film laminated cover materials, are highly sensitive to scratching, so that repeated passage through transport rolls will mar the wrap. Additionally, where the wrap color is very light, the wrap may be scuffed or discolored by the transport rolls, resulting in an unacceptable level of rejects or requiring expensive maintenance of highly clean conditions.

A principal object of the present invention is to overcome a number of the foregoing problems in edge-folding devices. The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention, reference should be had to the following detailed description taken in connection with the accompanying drawing wherein like numerals denote like parts, and wherein.

Briefly, the present invention comprise apparatus for and a method of folding and securing at least one edge of a relatively flexible larger sheet over the corresponding edge of a relatively stiff smaller sheet, wherein prior to folding, a surface of the sheet bears an adhesive coating in contact with the board so as to provide a laminated work-piece in which at least one adhesively coated edge of the wrap extends beyond a corresponding edge of the board. The process of and apparatus for forming such work-pieces are well known in the art. In the present invention, such work-piece is transported in a first, preferably horizontal plane in a first direction by an initial transport mechanism, such as a series of rollers, so that the extending edge is introduced by into a first wrapping head disposed at an initial wrapping or folding station.

The first wrapping head is characterized in having a pair of elongated jaws spaced substantially parallel to one another. The jaws are separated by a slot, the width of which is variable by relative motion of said jaws between a first position at which the slot width is greater than the thickness of the work-piece, and a second position wherein said work-piece can be firmly clamped between said jaws. Means are provided for moving the work-piece in a first direction with the extending edge directed toward the first wrapping head and for moving the jaws of the first wrapping head relative to the work-piece when the jaws are in their first or open position, so that preferably a portion of one of the jaws engages and folds the extending edge of the wrap over the corresponding edge of the board, thus causing the folded edge to adhesively adhere to the opposite surface of the board, and the folded edge is inserted into the slot between the jaws. Means are also provided for moving the said jaws to their second or closed position in which they clamp the folded edge of the work-piece and secure the adhesive bond between the wrap and the board. Lastly, means are included for moving the first wrapping head with the work-piece clamped between the jaws, preferably downwardly so that the clamped work-piece, held securely in the first wrapping head, extends in a first plane parallel to and displaced from the original horizontal plane.

When used in conjunction with a second wrapping head that is intended to fold over a second extending edge of the wrap opposite to the first extending edge (and thus the work-piece typically has four orthogonally extending edges), the first wrapping head with the clamped work-piece then moves along a second or lower plane that is approximately parallel to that first plane, in a second direction opposite to the first or original direction of movement of the work-piece coming from the rollers. This movement of the work-piece then introduces the opposite or second extending edge of the wrap and accompanying board into that second wrapping head at another wrapping or folding station. The second wrapping head, in a manner identical to the operation of the first wrapping head, folds that second extending edge of the wrap around the corresponding edge of the board, and tightly clamps the folded second edge of the wrap to the board. The first wrapping head releases the folded first edge and the second wrapping head removes the folded first edge from the first wrapping head, the first wrapping head then being returned to its initial location. The second wrapping head then moves preferably downwardly so that the clamped work-piece, held securely in the second wrapping head, extends in a third plane approximately parallel to and displaced from the first and second planes. The second wrapping head, with the work-piece clamped therein, is then moved along the third plane back in the first direction opposite to the second direction of movement of the work-piece, to introduce the work-piece into a known mechanism that preferably simultaneously folds and clamps the other two extending edges of the wrap to the board, the work piece having been released from the second wrapping head. The second wrapping head then is returned to its initial location, and the system is ready to process the next work-piece.

It will be seen that the wrapping heads serve as transport mechanisms to move the work-piece between wrapping or folding stations in an approximately S-shaped path, holding the work piece during such movement only by the clamped edges, minimizing the possibility of damage by the transport mechanisms to the main body of the wrap. Because the work-piece is held by the clamped edges during transport, at least during the wrapping process, the time of clamping is more than adequate to secure a satisfactory bond between the folded extending edges of the wrap and the board, and enables a manufacturer to fold difficult materials or use adhesives, such as resin adhesives, that the prior art tended to avoid because such adhesives tend to set up too slowly. As will be apparent from the detailed description of the apparatus of the present invention, when a pair of wrapping heads are used to make the first folds of two opposed extending edges of the work-piece, the two wrapping heads are positioned so that the slots lie in substantially parallel planes, the heads preferably being substantially identical, mirror-image devices.

It will also be apparent that a work-piece is shuttled back and forth between two extreme positions of the wrapping stations, hence those positions should be provided with a maximum horizontal separation by slightly more than the dimension of the wrap taken along the initial direction of horizontal motion of the work-piece. Thus, preferably the initial position of the second wrapping head is fixed and the first wrapping head disposed on a support or frame that is adjustable or movable in a horizontal direction to set the initial location of the first wrapping head. Once the location of the first wrapping station is established, no further adjustment is needed inasmuch as the travel of the work-piece while held by the wrapping heads is the same regardless of what horizontal plane the work piece is in. Accordingly, by making one simple adjustment of the horizontal distance between the wrapping heads and therefore the extreme locations of the wrapping or folding stations, one can very quickly and easily set the system to change the operation of the system from one series of like work-pieces to another series of work-pieces having substantially different dimensions.

Referring now to the drawing, there is shown in FIG. 1 a simplified schematic diagram of apparatus embodying the principles of the present invention for wrapping and transporting boards. FIGS. 1A through J inclusive illustrate the same apparatus, the various parts or elements of that apparatus being are shown in a sequence of positions as the process of the present invention is effected. For simplicity and clarity in exposition, only the basic parts of the apparatus of FIG. I are shown.

Figure 1A:
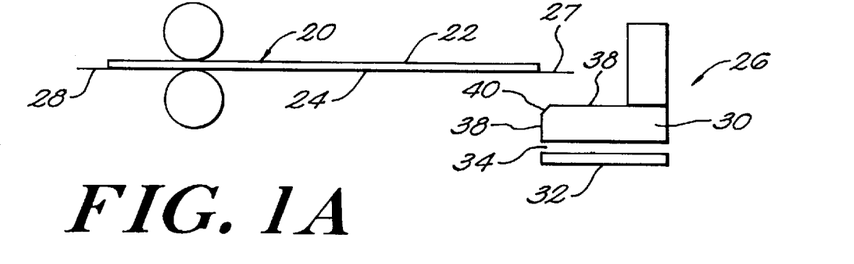
FIG. 1 is a first series of simplified schematic, side elevational views of apparatus embodying the principles of the present invention, showing a sequence of positions of parts of a wrapping head of the apparatus as the process is carried out.

FIG. 1A shows work-piece 20 formed as a substantially flat sandwich of board 22 and wrap 24 joined together by an adhesive layer (not shown) earlier applied to the upper surface of the wrap as is well known in the prior art. The wrap may be any thin, relatively flexible material such as paper, foil, cloth and the like. The board is preferably a thin, relatively stiff material, such as chipboard, cardboard, metal, wood and the like, about the edges of which, a wrap material may be folded. Both the board and wrap are typically rectangular, but can be provided in other configurations if desired.

The work-piece is presented to first wrapping head 26 in a first, preferably horizontal plane parallel to the plane of the work-piece and in a first direction by an initial, conventional, transport mechanism, such as rollers 25 or the like. Wrap 24 includes linear front or leading edge 27, linear trailing edge 28, and two side edges (not shown), all extending approximately parallel to the plane of work-piece 20 and protruding a short distance beyond the corresponding parallel edges of board 22. Wrapping head 26 is formed of elongated upper jaw 30 and elongated lower jaw 32 spaced parallel to another and separated by slot 34 which is variable in width. Upper jaw 30 includes front surface 36 disposed substantially parallel to the front edge of wrap 24 and extending upwardly to and joined to upper surface 38 by rounded upper edge or turn-in lip 40.

As shown in FIG. 1A, wrapping head 26 is initially positioned at a first wrapping station where upper surface 38 of jaw 30 is initially located parallel to but slightly below the path of work-piece 20 in the first horizontal plane. Jaws 30 and 32 are initially spaced apart with slot 34 dimensioned such that the distance between the jaws is substantially greater than the thickness of work-piece 20 and the latter can be easily moved into the slot.

Figure 1B:
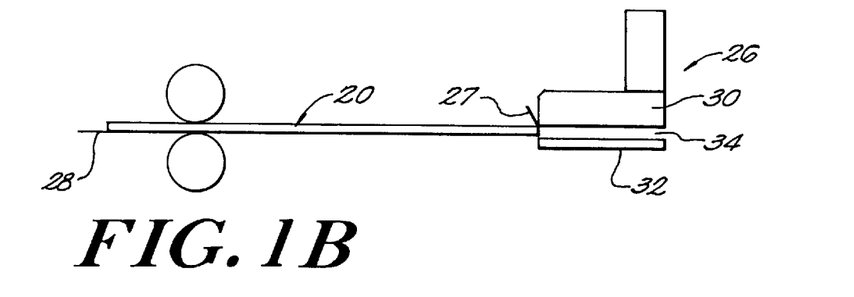
Figure 1C:
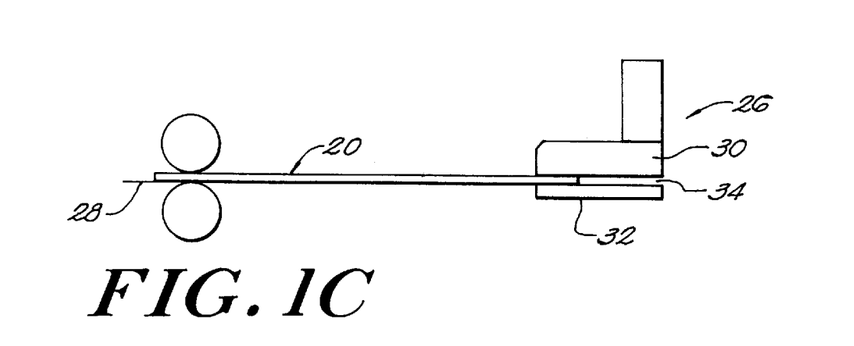

As illustrated in FIG. 1B, when work-piece 20 has been transported so that front edge 27 of wrap 24 is located just above turn-in lip 40, first wrapping head 26 is moved vertically upwardly so that lip 40 wipes or folds edge 25 upwardly until slot 34 is positioned in the plane of work-piece 20. At this point, as shown in FIG. 1C, the work-piece is inserted into slot 34, forcing edge 27 to contact the upper surface of board 22, the upward motion of head 26 being then arrested. While the edge or surface that serves to wipe or fold edge 27 is preferably built into upper jaw 30, other devices such as an independent bar, roller, brush and the like, operated in conjunction with the motion of head 26 could serve as well.

Figure 1D:
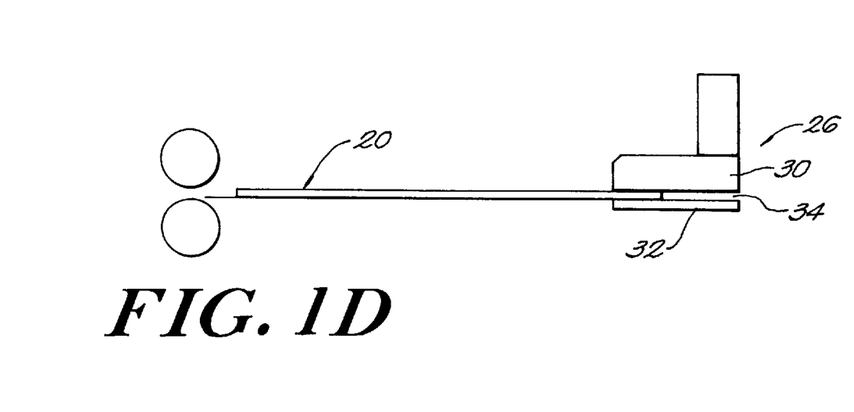

As seen in FIG. 1D, when work-piece 20 has advanced into slot 34 a predetermined distance typically equal to the width of edge 27 extending over the upper surface of board 22, jaws 30 and 32 are moved relative to one another vertically to firmly clamp folded edge 27 of wrap 24 onto the corresponding upper edge of board 22 work-piece and secure the adhesive bond between the board and edge 27 of the wrap. It will be seen in FIGS. 1A through 1D that first wrapping head 26, while initially positioned a distance less than the dimension of work-piece 20 in the direction of motion of the latter in the first horizontal plane, is moved horizontally away from the rollers as work-piece 20 is advanced toward head 26. This motion of head 26 away from the rollers insures that work-piece 20 is supported either by rollers or wrapping head 26 until work-piece 20 is engaged by wrapping head 26, at which point the latter has moved far enough so that it is displaced from the rollers by a distance somewhat greater than the dimension of work-piece 20 in the direction of motion of the latter, permitting the work-piece to be free of the rollers as particularly shown in FIG. 1D.

The apparatus of the present invention shown in FIG. 2, also includes second wrapping head 42 formed of upper jaw 44 and lower jaw 46 spaced from one another by horizontal slot 48 and movable toward on another to vary the width of slot 48. Upper jaw 44 includes front surface 50 disposed substantially parallel to trailing edge 28 of wrap 24 and extending upwardly to and joined to upper surface 52 by rounded upper edge or turn-in lip 54. Jaws 44 and 46 are initially spaced apart such that the thickness of work-piece 20 is substantially less than the distance between the jaws and the work-piece can be easily move into slot 48. It will be apparent that wrapping head 42 is preferably identical to and substantially a mirror image of first wrapping head 26.

Figure 2A:
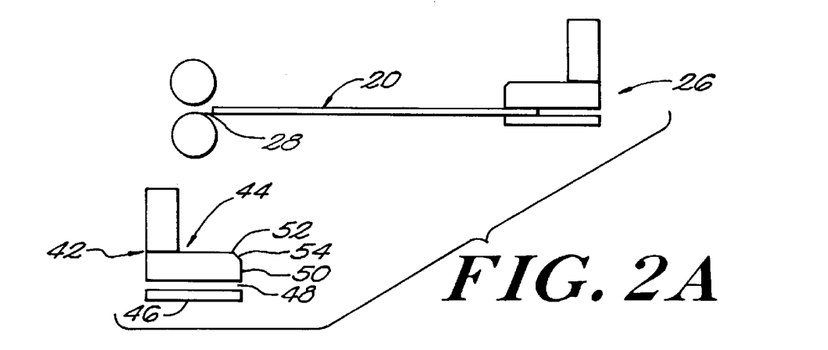
FIG. 2 is another series of simplified schematic, side elevational views of such apparatus showing a continuing sequence of positions of the various elements of the apparatus including a second wrapping head, as the process is carried out.
Figure 2B:
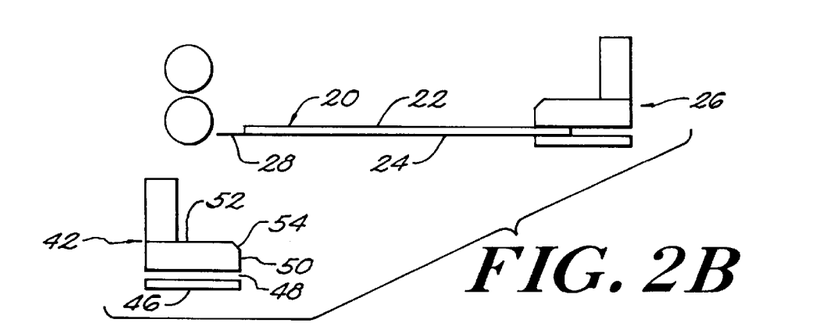
Figure 2C:
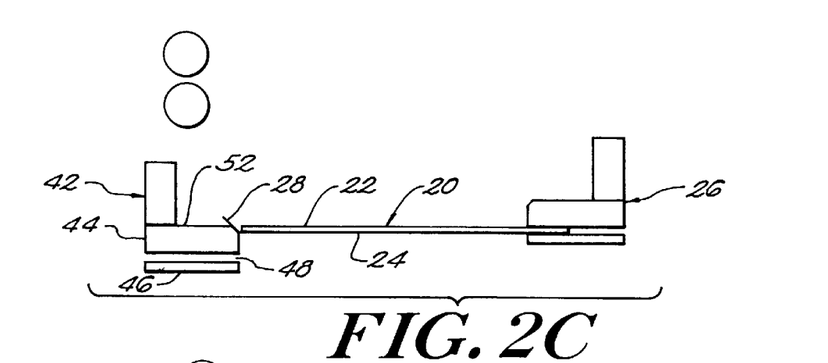
Figure 2D:
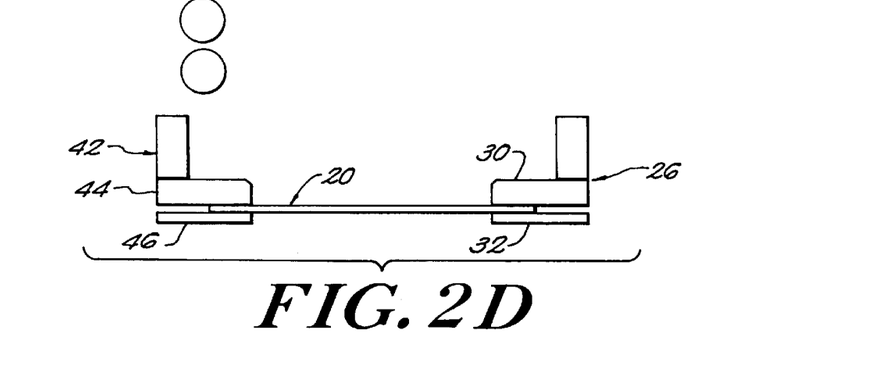

As shown in FIG. 2A, second wrapping head 42 is initially positioned at a second wrapping station separated horizontally from first wrapping head 26 by approximately the dimension of work-piece 20 in the plane of the latter. When trailing edge 28 of wrap 24 in work-piece 20 has cleared the rollers, first wrapping head 26, holding the first folded edge of work-piece 20, moves substantially vertically downward and a short distance horizontally toward second wrapping head 42 so that, as shown in FIG. 2b, trailing edge 28 extends over upper surface 52 of jaw 44. Continued downward motion of wrapping head 26 causes turn-in lip 54 to fold trailing edge 28 upwardly as shown in FIG. 2C. Continued motion of wrapping head 26 in the horizontal direction the work-piece with folded trailing edge 28 into slot 48, forcing edge 28 to contact the upper surface of board 22. As seen in FIG. 2D, when work-piece 20 has advanced into slot 48 a predetermined distance typically equal to the width of edge 28 extending over the upper surface of board 22, relative motion of jaws 44 and 46 to one another vertically serves to firmly clamp the folded edge of wrap 24 onto the corresponding upper edge of board 22 of the work-piece and secure the adhesive bond between the wrap and board.

When the trailing edge of the work-piece has become firmly clamped in slot 48 of second wrapping head 42, jaws 30 and 32 of first wrapping head 26 separate, releasing the leading edge of the work-piece. First wrapping head 26 then moves horizontally in a reverse direction away from head 42, allowing head 26 to clear folded leading edge 27 and return to its initial wrapping station to await the delivery of the next work-piece by the rollers. Second wrapping head 42, with the work piece firmly clamped in slot 48, conveys the work-piece downwardly and then horizontally in a direction opposite to the previous horizontal transport of the work-piece by first wrapping head 26, to a third wrapping station. At the third station, jaws 44 and 46 separate to release the work piece into a known, prior art mechanism (not shown) that preferably simultaneously folds and clamps the two extending side edges of the wrap to the board. Second wrapping head 42 then is returned to its initial wrapping station to await delivery of another work-piece by first wrapping head 26.

Figure 3:
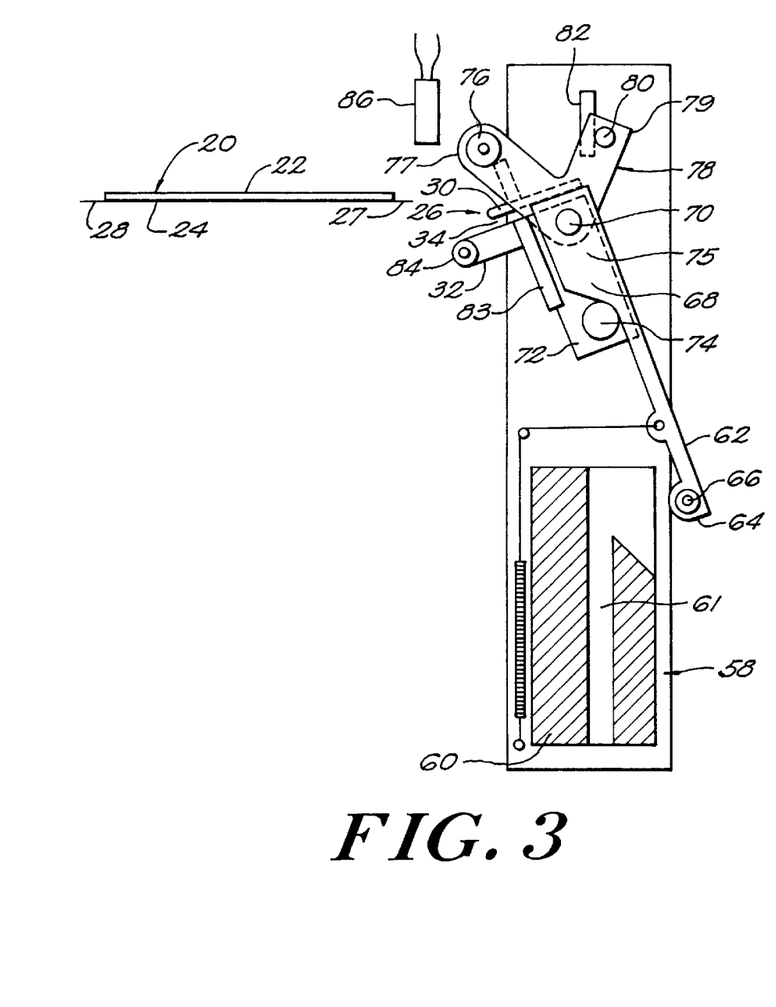
FIG. 3 is yet another series of simplified, schematic, side elevational views, partly in phantom, of mechanism for effecting the movement of the parts of the wrapping head of FIG. 1.

A simplified version of mechanism for effecting the various motion of the parts of the apparatus of the invention as thus described is shown in FIG. 3 which includes cam block 60 fixedly mounted on frame 58 block 60 is provided with linear, vertical cam slot 61. The apparatus of FIG. 3 also comprises pivot control arm 62, an elongated element bearing adjacent one end 64 thereof pivot arm follower 66 typically in the form of a projecting roller or pin extending perpendicularly to the long axis of arm 62. Follower 66 is disposed and dimensioned to slide within cam slot 61 and, as will be described, controls motion of pivot control arm 62 and many of the parts coupled to the latter through much of the cycle of operation.

Mounted on pivot control arm 62 adjacent the other end 68 thereof is master pivot shaft which also extends perpendicularly to the long axis of arm 62 and is movable with arm 62. Cylindrical tension spring 71 is connected at one end to frame 58 and at its other end to an intermediate portion of arm 72 so as to bias to latter to rotate end 64 toward slot 61. Crank 72, an elongated bar, is fixedly mounted adjacent end 73 thereof on crankshaft 74 so that crank 72 can be driven in rotation about crankshaft 74, the position of which is fixed with respect to frame 58. Conventional means (not shown for the sake of simplicity and clarity), such as a motor, gears, sheave-and-pulley arrangement and the like, are preferably provided for driving crankshaft 74 in rotation. The other end 75 of crank 72 is pivotally coupled to master pivot shaft 70 about which crank 72 may also rotate.

The apparatus of FIG. 1 also includes cylindrical infeed roll 76, driven by conventional means (not shown) in rotation about it cylindrical axis and mounted adjacent one arm 77 of L-shaped beam 78. Mounted adjacent the end of other arm 79 of beam 78 is projecting stop 80. Release bar 82 is provided for contacting stop 80 to control rotation of beam 78 about pivot shaft 70. Upper jaw 30 is mounted on movable press bar 83 so as to be movable therewith toward and away from lower jaw 32 to vary the width of slot 34.

Beam 78 is also pivotally mounted at the junction of the two arms 77 and 79 for rotation about master pivot shaft 70. Freely rotatable, cylindrical idler roll 84 is mounted on lower jaw 32 adjacent the front surface thereof, the axis of rotation of idler roll 84 being perpendicular to the axis of elongation of jaw 32 and parallel to the axis of rotation of infeed roll 76.

Figure 3A:
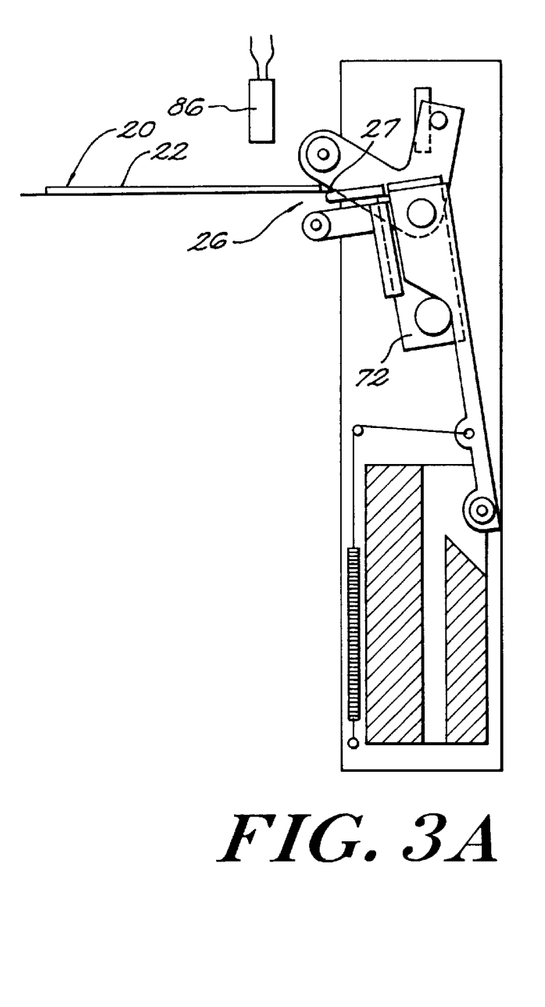
Figure 3B:
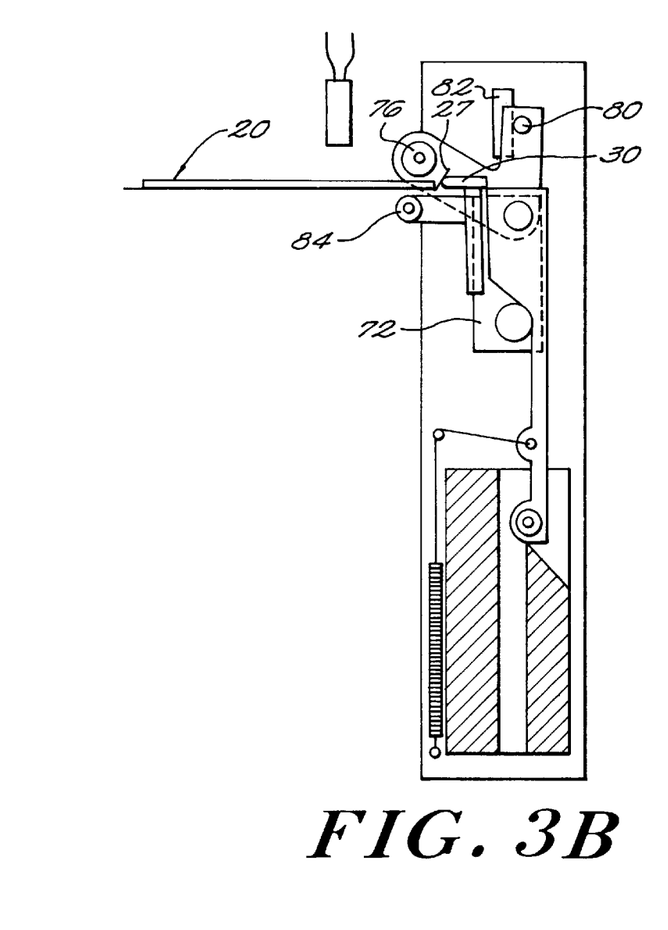
Figure 3C:
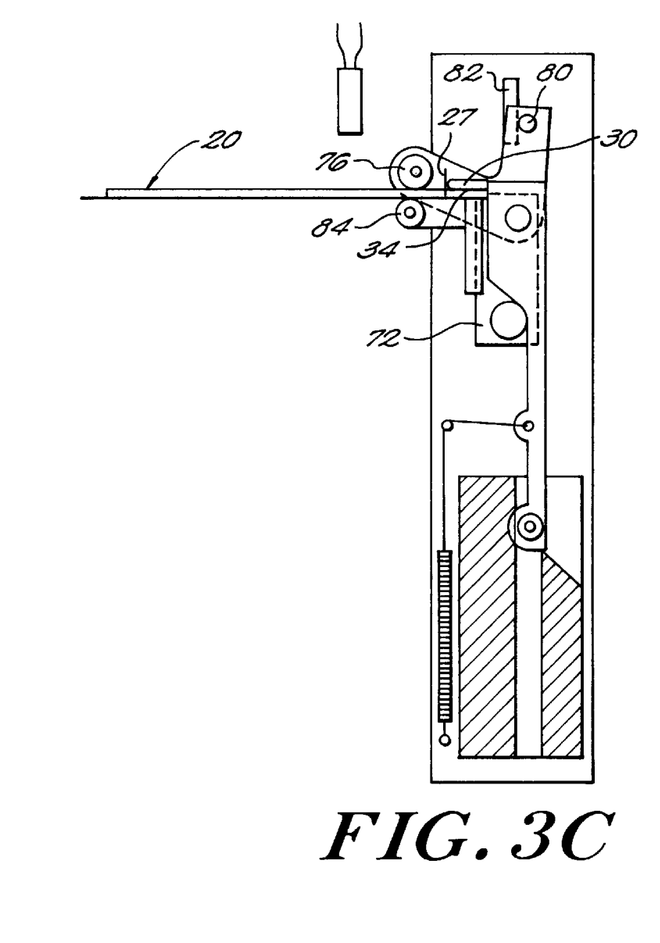
Figure 3D:
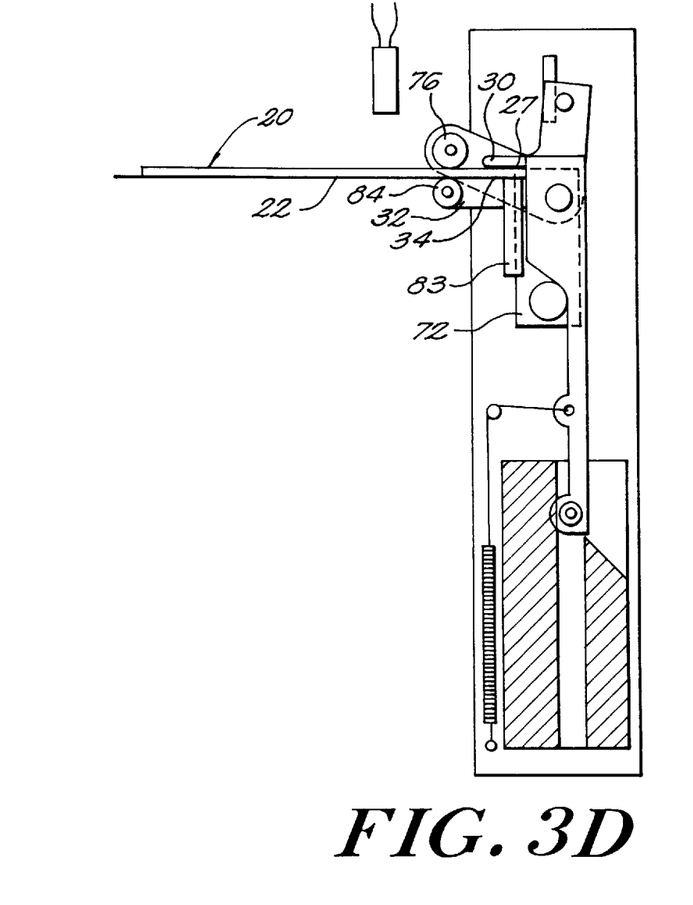
Figure 3E:
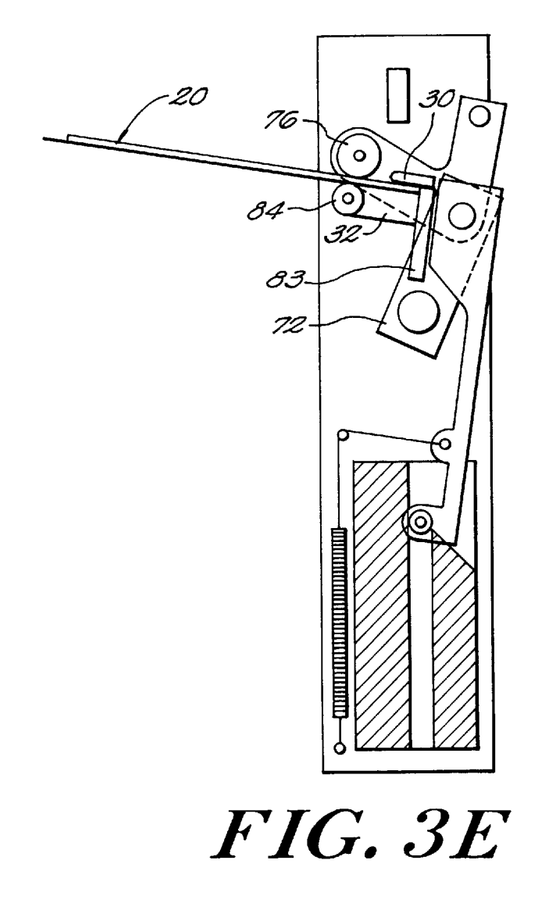

In operation of the apparatus of the present invention shown in FIG. 3, as well known in the part art, initially an adhesive is applied to a glue-spreading roll and the wrap 24 is fed over the glue-spreading roll so that the adhesive is transferred to one surface of the wrap. Board 22 is applied in registration to the adhesive surface of the wrap to form work-piece 20 which is then presented to first wrapping head 26 from the left as seen in FIG. 3A. Photosensor is positioned adjacent head 26 so that it can detect the advent of edge 27 of work-piece 20 and start the rotation of crank 72. As work-piece 20 approaches head 26, the initial rotation of crank 72 (clockwise as seen in FIG. 3B), edge 27 of work-piece 20 projects above and engages turn-in lip 40. Continued rotation of crank 72 raises turn-in lip 40 while release bar 82 moves away from stop 80, permitting infeed roll 76 (which is preferably driven in rotation by a separate motor) to move downwardly toward idler roll 84 as illustrated in FIG. 3C. This combined motion of work-piece 20 to the right (with reference to FIG., 3B), the movement of roll 76 downwardly, and the upward movement of upper jaw 30 engaging leading edge 27 of the work-piece, cause the leading edge to be turned upwardly as the work-piece is moving into slot 34. Thus, as shown in FIG. 3D, when crank 72 has reached top dead center, work-piece 20 has been clamped between idler roll 84 and infeed roll 76 and is being positively driven into slot 34 by the rotation of roll 76, folding edge 27 over the corresponding edge of board 22 so that the glued surface of edge 27 contacts the upper surface of the board. When insertion of the work-piece into slot 34 and the folding of edge 27 onto the board as thus described has been accomplished, press bar 83 is lowered forcing upper jaw 30 to clamp the work-piece firmly against lower law 32 as set forth in FIG. 3E.

Figure 3F:
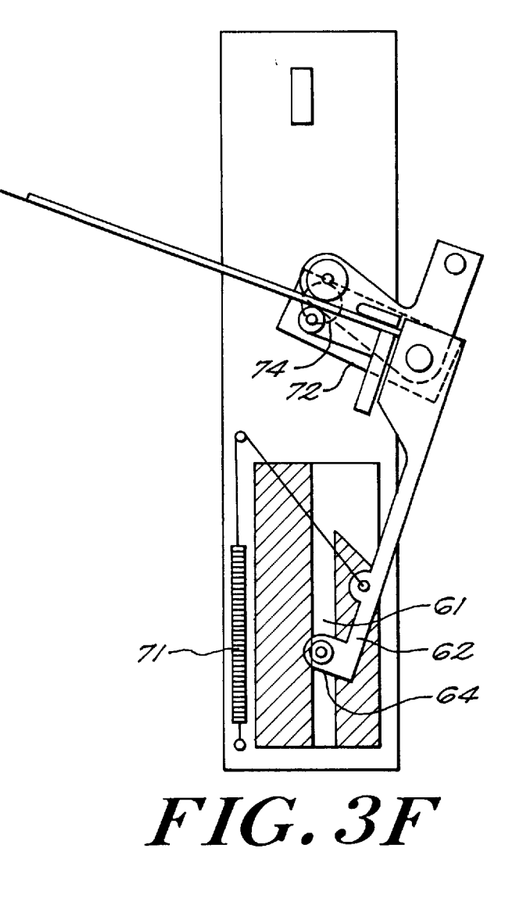
Figure 3G:
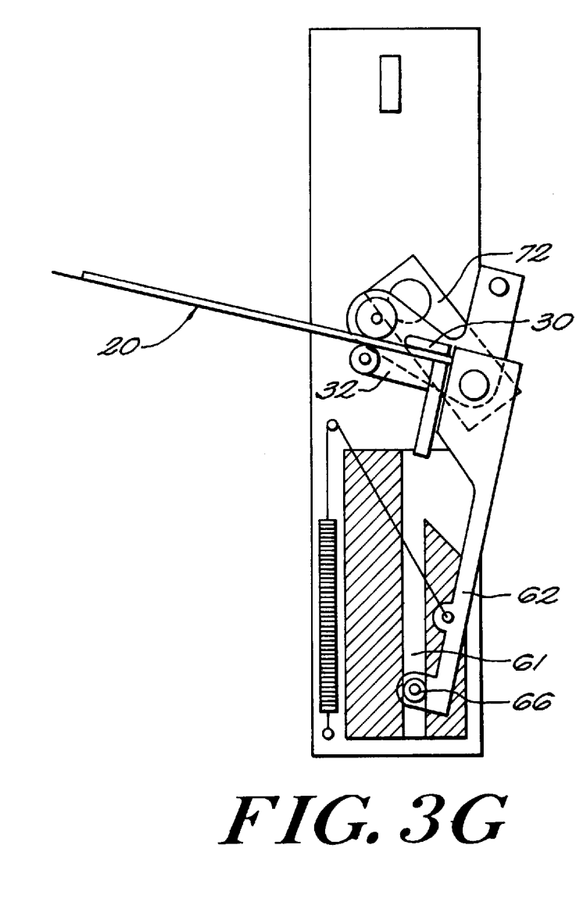
Figure 3H:
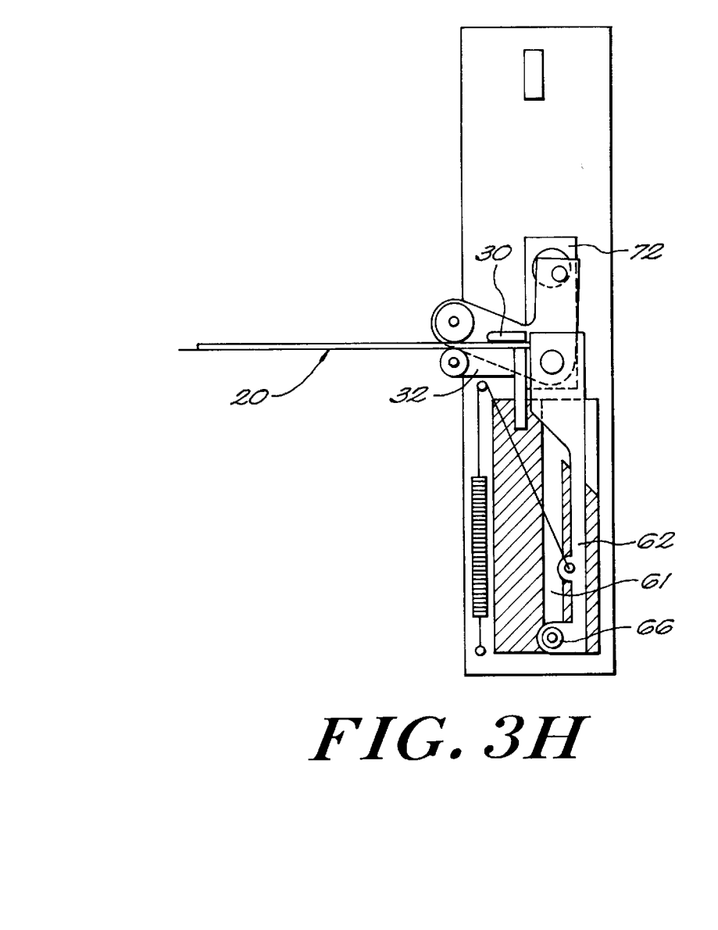
Figure 3I:
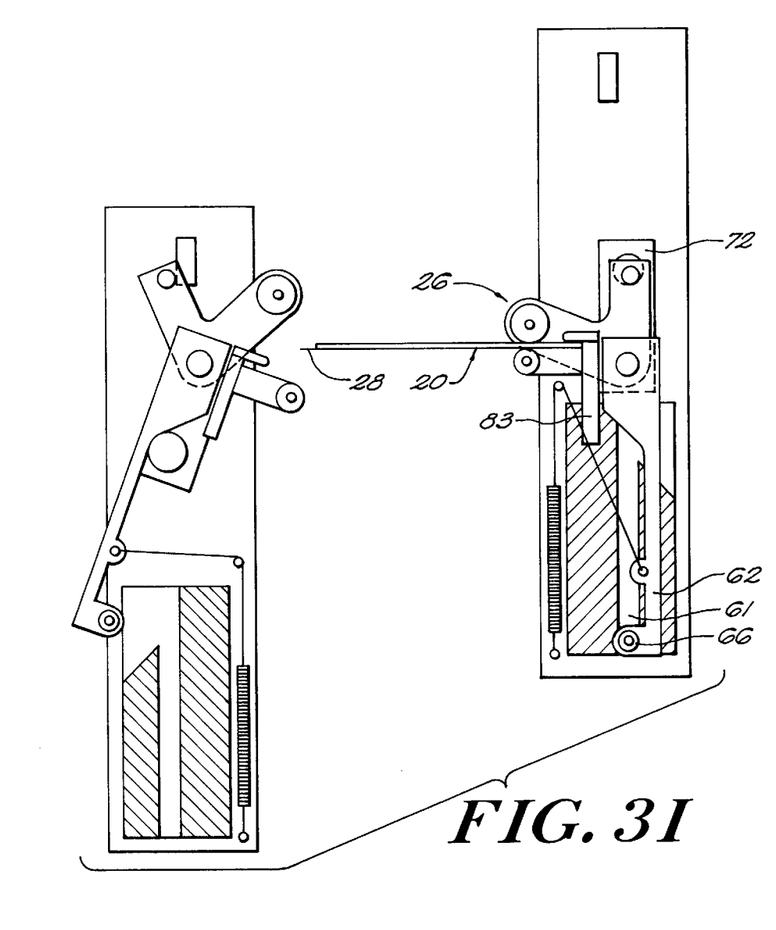

End 64 of pivot control arm 62, initially prevented from moving toward slot 61 under the bias of spring 71 by engagement with crankshaft 74, now is freed by the continued rotation of crank 72 beyond top dead center, and moves into engagement with slot 61 as shown in FIG. 3F. FIGS. 3G and 3H shows that as clockwise rotation of crank 72 continues, arm 62 with pivot arm follower 66 constrained by slot 61 slides downwardly into the latter, and this downward motion of arm 62 carries work-piece 20, clamped between jaws 30 and 32, downwardly as well. As seen in FIG. 3I, when crank 72 reached bottom dead center, arm 62 and follower 66 have reached the extreme end of their travel downwardly in slot 61, so press bar 83 is raised to unclamp work-piece 20 and infeed roll is now rotated in the opposite direction to eject the work-piece, As described above, work-piece 20 is ejected so that the trailing edge 28 thereof is now presented to the second wrapping head where the sequence of events in repeated to fold edge 28. The now freed first wrapping head 26 is returned to its initial position by continued rotation of crank 72.

It will be appreciated that in the process of the invention, the transport of the work-piece between wrapping stations is accomplished simply by moving the appropriate corresponding wrap head with the work-piece only held therein by the one edge at a time so as to minimize contact of the wrap by other surfaces that might mar or abrade the wrap. Further, because the clamping of the folded edges of the work-piece continues during the transport interval, the adhesive is given a comparatively long time to set up under pressure and effect a superior seal.

Figure 4:
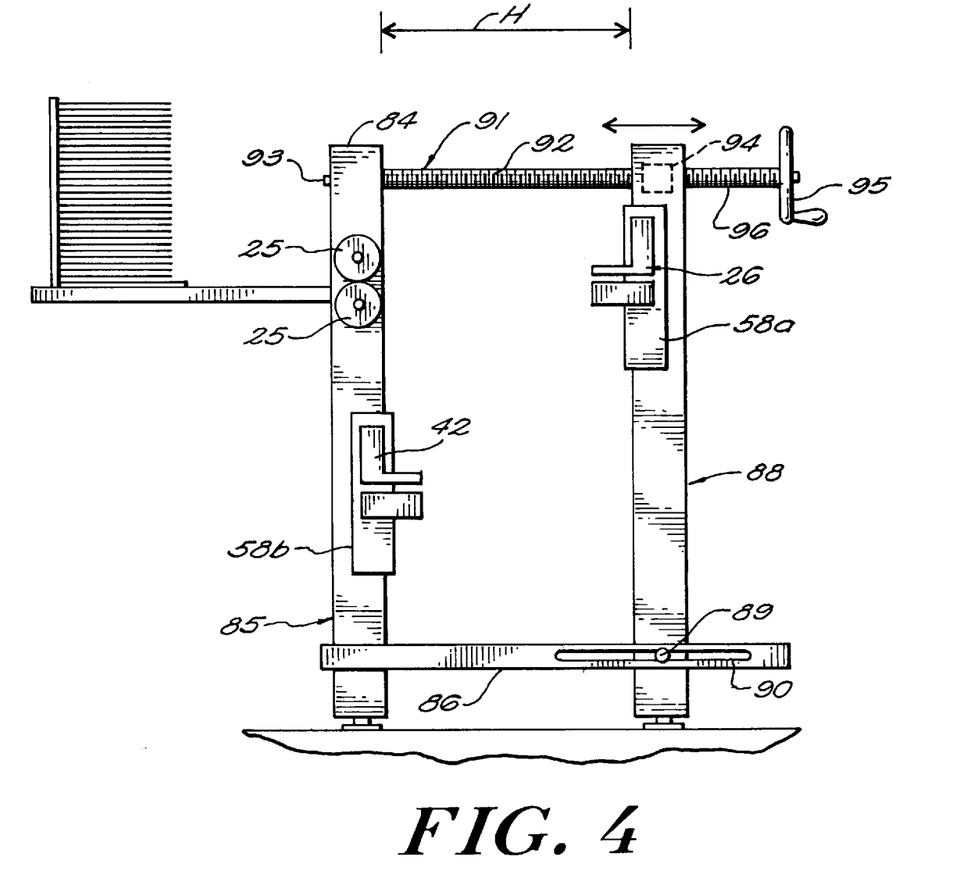
FIG. 4 is an elevational schematic diagram illustrating a mechanism for adjusting the apparatus of the present invention to accommodate work-pieces of different dimensions.

As shown in FIG. 4, means are provided for adjusting the distance between the initial or rest position of the first wrapping head and the means, such as rollers 25, for moving the laminated work-piece to the first wrapping head, in order to accommodate easily the apparatus to process work-pieces of various sizes. To this end, in a preferred embodiment of the present invention, rollers 25 are rotatably mounted in a fixed position on elongated, vertically extending portion 84 of chassis 85. Frame 58b of second wrapping head 42 is also fixedly mounted on vertically extending portion 84, preferably being positioned substantially below rollers 25. Chassis 85 includes horizontally elongated portion 86 fixed to and extending normally to the axis of elongation of portion 84. Frame 58a of first wrapping head 26 is fixed mounted on movable support beam 88 which, in turn, is connected adjacent one end thereof by pin 89 slidingly captured in slide means such as linear slot 90 formed in and extending substantially along the axis of elongation of portion 86.

As means for moving support beam 88 along slot 90, elongated lead or power screw 91, typically with square threads 92, is provided, screw 91 is mounted for rotation about its longitudinal axis with distal end 93 of screw 91 being rotatably captured in well 94 provided in portion 84 of chassis 85. Threads 92 of screw 91 engage internal threaded bushing 94 which is fixed to and extends through support beam 88 and terminates at manually operable wheel or crank 95 fixed to proximal end 96 of screw 91 so that the screw and crank are rotatable together. It will be apparent that rotation of crank 95 will, because of the engagement of threads 92 with the internal threads of bushing 94 and depending on the direction of rotation of the crank, move beam 88 and first wrapping head 26 supported thereon, either toward or away from rollers 25 and second wrapping head 42. The horizontal separation shown as H in FIG. 4 between the wrapping heads, at least at their rest or initial positions of operation, can thus be readily set by rotation of crank 95 to be based upon the dimension of the wrap taken along the initial direction of horizontal motion of the work-piece. Because the initial position of second wrapping head 42 is fixed by mounting of its frame 58 on chassis 86, and first wrapping head 26 is disposed on beam 88 the position of which is adjustable or movable in a horizontal direction, the position of first wrapping head 26 can very quickly and easily reset with comparatively negligible down-time, to accommodate for another run of boards and wraps of a different size. Although the means for adjusting the distance between rollers 25 and first wrapping head 26 is shown as basically comprising a power screw and bushing, it will be apparent to those skilled in the art that many other well-known mechanisms for effecting precise linear displacements, such as a rack-and-pinion gear and the like, can be substituted.

Since certain changes may be made in the above-described apparatus and method without departing from the scope of the invention herein involved, all matter contained in the above description shall be interpreted in an illustrative and not in a limiting sense.

What is claimed is:

1. Process of folding and securing at least one edge of a relatively flexible larger sheet over a corresponding edge of a relatively stiff smaller board positioned on and in contact with a surface of said sheet bearing an adhesive coating in contact with said board to form a laminated work-piece providing at least one extending edge of said sheet, said process comprising the steps of:

moving said work-piece in a first direction to a first work-station wherein said extending edge is engaged and folded over said corresponding edge of said board at said first work station so that said extending edge, when folded, adhesively adheres to the opposite surface of said board;

clamping said folded edge of said work-piece to secure an adhesive bond between said extending edge and said board;

moving the clamped work-piece by holding said clamped edge, to effect transport of said work-piece in a second direction substantially opposite to said first direction.

2. Process of folding and securing as defined in claim 1 wherein the motion of said work-piece in said first direction is substantially in a first plane, and the motion of said work-piece in said second direction is substantially in a second plane displaced from and approximately parallel to said first plane.

3. Process of folding and securing as defined in claim 1 wherein the motion of said work-piece in said second direction is to a second work station, said process further including the steps of     engaging and folding the oppositely extending edge of said sheet in said work-piece over a corresponding edge of said board so that said oppositely extending edge, when folded, adhesively adheres to the opposite surface of said board;

clamping said folded oppositely extending edge of said work-piece to secure an adhesive bond between said oppositely extending edge and said board;

moving said work-piece by holding the clamped oppositely extending edge, to effect transport of said work-piece in a third direction substantially opposite to said second direction.

4. Process of folding and securing as defined in claim 3 wherein the motion of said work-piece in said first direction is substantially in a first plane, the motion of said work-piece in said second direction is substantially in a second plane displaced from and approximately parallel to said first plane, and the motion of said work-piece in said third direction is in approximately a third plane displaced and approximately parallel to said second and first planes.

\* \* \* \* \*